Figure 1:
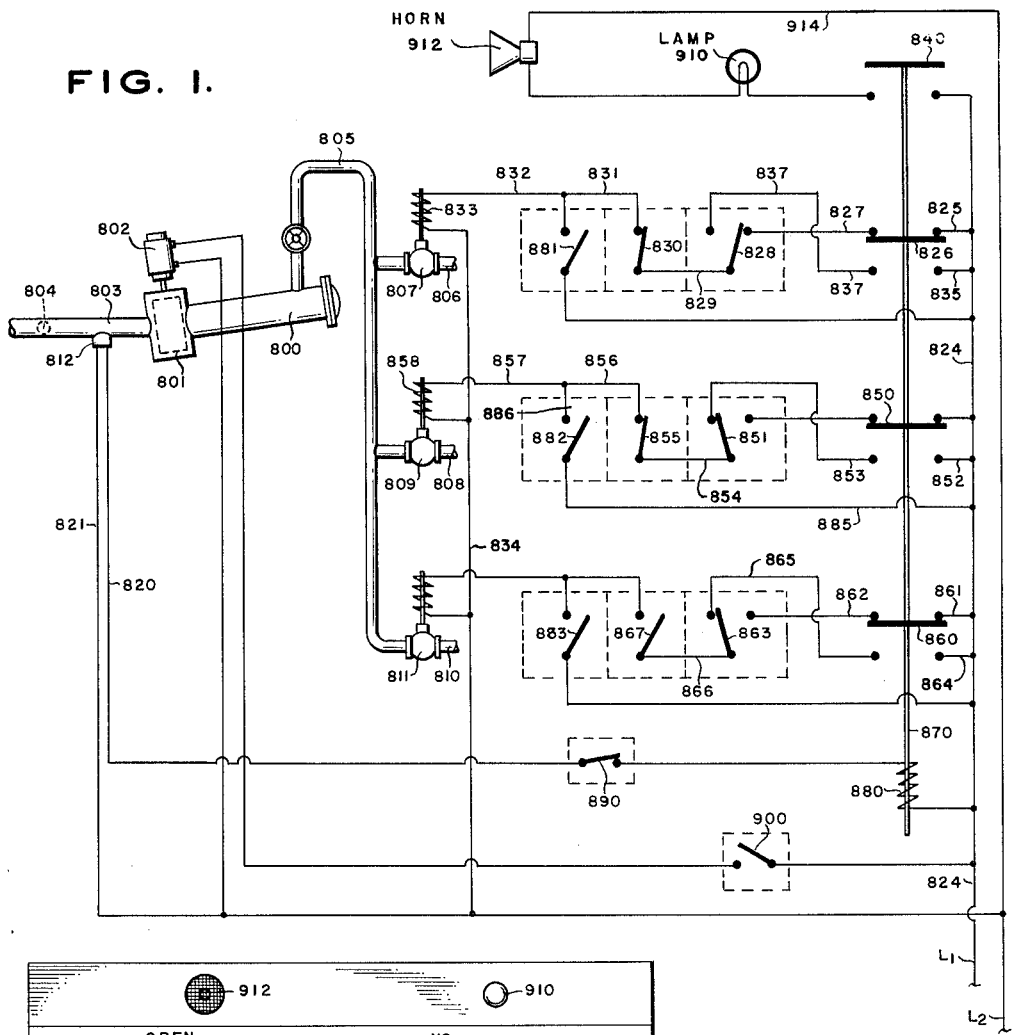

Nov. 23, 1965 E. A. ERICSON 3,219,050
CONTROL SYSTEM FOR A PIPELINE HAVING A PLURALITY OF BRANCHES
Original Filed Dec. 22, 1961

INVENTOR.
ERNEST A. ERICSON,
BY
ATTORNEY.

United States Patent Office 3,219,050
Patented Nov. 23, 1965

3,219,050
CONTROL SYSTEM FOR A PIPELINE HAVING A PLURALITY OF BRANCHES
Ernest A. Ericson, Channelview, Tex., assignor, by mesne assignments, to Esso Research and Engineering Company, Elizabeth, N.J., a corporation of Delaware
Original application Dec. 22, 1961, Ser. No. 161,558, now Patent No. 3,158,888, dated Dec. 1, 1964. Divided and this application Mar. 2, 1964, Ser. No. 348,595
6 Claims. (Cl. 137—112)

This is a division of copending application Serial No. 161,558, filed December 22, 1961, now Patent No. 3,158,888.

The present invention relates to the launching of pipeline scrapers (or "pigs"). More particularly, the present invention deals with the launching of pipeline pigs from a magazine whereby a plurality of pigs may be stored and from whence the pigs may be injected into a pipeline without interrupting the flow of fluid through said pipeline, allowing continuous flow of fluid through the launching mechanism at all times, and allowing the selective introduction of one or a plurality of scrapers at predetermined time intervals without interrupting the flow of fluid through the launching mechanism.

In the operation of product or crude oil pipelines, or of any other pipeline which is susceptible to the deposition of surface contaminants, it is desirable at intervals to pass a scraper or pig through said pipeline in order to remove materials which have deposited on the inner surface of the pipes. One of the more desirable forms of pipeline scrapers is made up of a spherical or spheroidal flexible pig which may be filled with a fluid such as a liquid to a diameter of about 1% greater than the inside diameter of the pipeline and then forced through the pipeline by the pressure of the flowing stream. The present invention relates to a control system whereby the launching and receiving of spherical pigs may be used as a means for controlling the conduit through which the fluid is passed, thus enabling automatic shifting of the fluid stream from one storage tank to another when utilizing pigs as interface barriers in pumping slugs of different fluids through the same pipeline.

Figure 2:
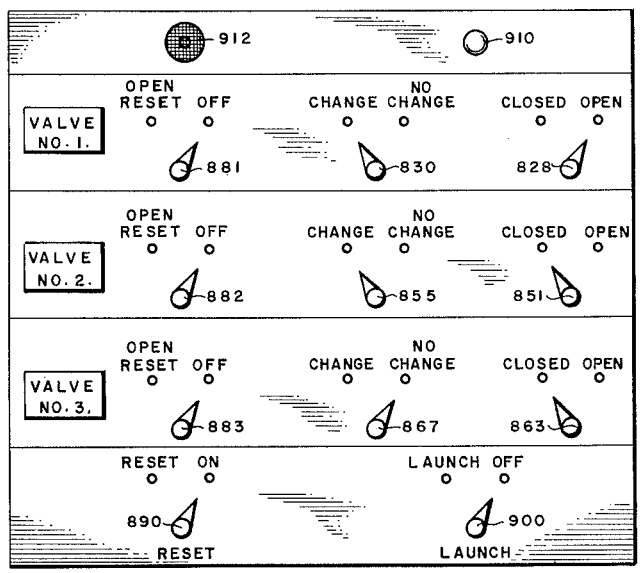

In order better to understand the nature of the present invention, attention is directed to the drawings wherein:

FIG. 1 is a schematic diagram of an automatic control system for use with pig launching apparatus; and FIG. 2 is a representation of the simplified control board used with the control system of FIG. 1.

By reference to FIG. 1, the control system of the present invention can be seen to comprise a plurality of valves 807, 809 and 811, each circuit means being identical to the other circuit means and operating a single valve. Taking the circuit means for controlling valve 807 as exemplary, it can be seen to comprise first electrically conductive means 824 (which terminates in contacts at 825 and 835), second electrically conductive means 827, and third electrically conductive means 837; first switch means 826 for selectively connecting either of said second electrically conductive means 827 and said third electrically conductive means 837 to said first electrically conductive means 824; fourth electrically conductive means 829, 831, 832 for energizing a valve actuator shown as the solenoid 833; second switch means 828 for selectively connecting the first electrically conductive conductive means 827 and said third electrically conductive means 837 to said fourth electrically conductive means 829, 831, 832. A third switch means 830 is interposed in the fourth electrically conductive means intermediate the portions 829 and 831, and is operative for selectively interrupting the flow of electricity through the fourth electrically conductive means.

It will be noted that the means 870 is provided for moving all of said first switch means 826, 850, and 860 in concert from a first position connecting each of said first and said second electrically conductive means to a second position connecting each of said first and said third electrically conductive means. It will also be noted that in each of said circuit means (as exemplified by the circuit means controlling valve 807) short-circuiting means through switch 881 are provided for bypassing the first, second and third switch means for selectively connecting the first electrically conductive means 824 with the fourth electrically conductive means 829, 831, 832 for energizing the solenoid 833.

Referring now to FIG. 1, wherein a schematic diagram of an automatic system responsive to the launching and receiving of spherical pigs is set forth, the pig launching mechanism is designated by the numeral 800, comprising a basket means 801, which is moved by a motor 802 having a control circuit such that a 180° revolution of the basket is automatically accomplished each time the motor is energized, such circuits being well known in the art. A line 803 is shown through which the pig 804 may pass in either direction. For the purpose of explanation of the figure, it will be assumed that the pig is passing toward the launching and receiving mechanism 800 through 803, with the flowing stream being discharged through line 805 for storage in a tank fed by line 806 controlled by valve 807. Alternate storage tanks are served by line 808, controlled by valve 809, and line 810, controlled by valve 811. The control valves are shown for the purpose of explanation as being solenoid valves normally closed but opened by the passage of current through the solenoid control element. It is to be understood that pneumatic control valves or electronic control valves could be used for this purpose. The passage of the pig 804 through the line 803, in either direction, is sensed by means 812 which may comprise a spring-loaded mechanical switch responsive to a probe extending into the pipeline (such as that shown in application Serial No. 818,723 filed by R. H. Pfrehm now Patent No. 3,021,703), which is tripped by the passage by sphere 804 through the line, or may comprise a reply switch with a holding circuit which is energized by passage of the pig and which will maintain a current flow through the electrical lines 820 and 821, hereinafter more fully described, until the current through those lines is broken by a switch, at which time the holding circuit releases the relay and the sensing means 812 is again ready for service. Such switch means are well known in the electrical arts. Preferably, the relay and holding circuit type of sensing means will be employed. The schematic diagram of FIG. 1 illustrates the condition of the circuit when the liquid is flowing through line 803 and is discharged for storage via line 805 into the tankage served by line 806, valve 807 being maintained in the open position. Valves 809 and 811 are in the closed position during this type of operation. Assuming that a type of hydrocarbon or other liquid which is intended for storage in tankage other than that supplied by line 806, for example, intended for storage by way of line 808, is passing through the line 803, the pig 804 being positioned at the interface between the two diverse types of fluid flowing through the line. It is the functon of the control circuit shown to enable the operator to preset the control system to make the tankage switch upon arrival of the interface, as indicated by the passage of the pig 804 through the line, and thereby to cause the tankage switch to be made automatically without the delay which would be inherent in manual control. As the control circuit is set up in FIG. 1, power is supplied by lines $L_1$ and $L_2$. Line $L_1$ is directed into the control board by way of line 824, and the current is passed into valve 807 by way of line 824, line 825, switch 826, line 827, switch 828, line 829, switch 830, line 831 and line 832. The solenoid 833 of valve 807 is connected by line $L_2$ by way of line 834 so that as the circuit is set up, current flows through solenoid 833 is order to maintain the valve 807 in the open position. Note that no current flows through the solenoid coils of the other valves during this period of time, and, therefore, they remain in the normally closed position.

Returning now to switch 826, it will be seen that switch 826, along with switches 840, 850 and 860 are mounted on a bar 870 which passes through a coil 880. This type of solenoid switch is well known in the art and is maintained in the position shown in FIG. 1 by a spring, not shown. Upon passage of a current through the coil 880, the switches mounted upon bar 870 are moved to a second position which is indicated by the open contacts below the contacts being closed by the switches 826, 850 and 860.

Upon energization of the coil 880 by passage of the pig through the line, the switches will be moved into their second position, and the line 806, controlled by valve 807, will be automatically shut off. This is accomplished as will be seen by advertence to FIG. 1, by following the path of line $L_1$ through line 824, line 835, switch 826, and line 837, at which point the switch 828 is open and no current can flow from line $L_1$.

Referring now to the control system for valve 809, which is in the closed position and which is to be opened by the passage of pig 804, it is seen that switch 851 is in the open position with respect to line $L_1$ when the switch 850 is in its first position, and, therefore, the solenoid valve 809 is maintained in the closed position. Upon the movement of switch 850 to the second position, however, current is allowed to flow through line 824, line 852, switch 850, line 853, switch 851, line 854, switch 855, line 856 and line 857 into the solenoid 858 of valve 809. The solenoid 858 is connected to line $L_2$ by way of line 834, as in the case of valve 807. Therefore, upon movement of the switch into the second position, current will flow through valve 809 and will cause the opening of that valve so that the fluid may flow through line 808 at the same time the line 806 is being shut down.

Referring now to valve 811 in line 810, which is in the closed position during the initial period and which is desired to be maintained in the closed position after the movement of the switch into the second position, it is seen that line $L_1$ is connected by way of line 824 and line 861, switch 860, and line 862 and is broken by switch 863 when the switch 860 is in the first position. Upon passage of the switch 860 into the second position, line $L_1$ is connected by way of line 824, line 864, switch 860, line 865, switch 863, and line 866 and is broken by switch 867. It is, therefore, seen that at neither position of switch 860 is the valve 811 maintained in the open position.

After movement of the switches carried by the bar 870 into the second position, it becomes necessary to reset the switch before reception of the pig in another instance. In order to maintain the valve which has been opened by the movement of the switches carried by bar 870 in the open position during the reset period, it is necessary to maintain a flow of current through the solenoids controlling those valves. In the example stated above, the valve 809 must be maintained in the open position while the switches carried by bar 870 are returned into their normal positions. It is for this purpose that the reset open switches 881, 882 and 883 have been provided. Switch 882 controls the valve 809 and is placed in the closed position, designated "open reset" on the control board, and current is passed from line $L_1$ through line 824, line 885, switch 882, line 886, line 857 and solenoid 858 with return being made by line 834 through line $L_2$. The valves therefore are maintained in the open position while the bar 870 is returned to its initial position by opening switch 890, which breaks the flow of current through the coil 880 and allows the return of the switches to their original position. At this point, the switch 851 may be turned to the open position and switch 882 turned to the "off" position, and then, upon closing of the switch 890, the valve 809 will remain open until the passage of a pig through the line, at which time it may be automatically closed.

It should be noted that before the operation of the reset switch 890, the valves which had been automatically closed must be maintained in the closed position by turning the switches (for example, switch 828) into the closed position on the control board, otherwise these valves would be reopened upon return of the switches (for example, switch 826) into the original position.

It is thus seen that the switching of the various tanks or of the various lines may automatically be accomplished by the arrival of the pig, by setting the switches in the control system in a predetermined pattern in order to accomplish the desired result. This will be more fully discussed hereinafter in connection with FIG. 2.

The system of operating the valves automatically, as set forth above in connection with the reception of pig 804 by the launching and receiving mechanism 800 is as fully applicable to the launching of the pig as it is to the receiving thereof. In this case, the basket 801 may be rotated by motor 802, actuated by the closing of switch 900 for release of a pig which in passing by sensing means 812 will cause the opening and closing of the valves as hereinabove set forth, thereby automatically changing the nature of the stream flowing through the pipeline, minimizing the losses or admixture of products. Similarly, the portion of the stream which would represent an admixture of impure products may be maintained within a confined space by launching a first pig which would operate the switching of the valves and cause a change in the nature of the stream. The stream ahead of the pig would be substantially pure, while the stream behind the pig would contain an admixture of products. It would then be feasible, after the passage of a time period sufficient to flush out of the line most of the preceding products, to operate the pig launcher through another launching cycle, and a second pig would then precede substantially pure product of the second nature. By launching the two pigs before operating the reset mechanism of the control system, the valves would not be again operated by passage of the second pig, and good control of the system could thereby be attained.

Particularly in connection with the reception of a pig by the launching mechanism, warning devices are provided to indicate to the operator that the switch has been moved from its first to its second position and, therefore, requires reset before it can be depended upon for a second cycle of operations. The warning light 910 and horn 912 are connected in series by way of lines $L_2$, line 914 and line 916 through switch 840. Upon movement of the bar 870 into its second position, the switch 840 closes the circuit and causes the warning light and horn to be actuated, thereby indicating to the operator that the switch requires reset before use in a subsequent cycle.

Referring now to FIG. 2, the simplicity of operation of the present control system is shown by reference to the control board and positions of the switches as has been indicated thereon. A series of three switches is provided for each valve, corresponding, for example, with respect to valve 807, to the switches 881, 830, and 828. The valve 807 is maintained in the opening position prior to passing of the pig by moving the switch 828 into the "open" position. As has been shown hereinabove, the switch maintains a current through the solenoid 833 and keeps the valve in the open position. Since the position of the valve is desired to be changed by passage of the pig through the line, the switch 830 is maintained in the "change" position, corresponding to the position shown in FIG. 1. The open reset switch is maintained in the "off" position at all times except during the reset operation. As has been shown hereinabove, at the time that the pig 804 passes through the line 803, the position of the valve will be changed from open to closed. At that time the warning device will indicate to the operator that the change has taken place, and the switch 828 will be moved to indicate "closed," which is the desired new position. With respect to valve 809, which is closed initially but desired to be open, the switch 851 is initially turned to the "closed" position, indicating the desired state of affairs in the initial case. The change switch 855 is moved to the "change" position since it is desired to have the position of the valve changed from closed to open. The open reset switch is, as stated above, maintained in the "off" poition. Upon passage of the pig through the lines, the valve automatically will be open, and will be maintained open by moving the open reset switch into the "open reset" position, moving the switch 851 into the "open" position, and activating the reset switch 890, at which time the switches will be moved into the normal position, and thereafter the open reset switch will be returned to the "off" position.

Referring now to the control of valve 811, which it desired to maintain in the closed position both before and after the passage of the pig through the line 803, the switch 863 is in the "closed" position, and switch 867 is placed in the "no change" position since no changes are desired in the positioning of the valve. The open reset switch is maintained in the "off" position throughout.

Therefore, it is seen that by a simple setting on the control board prior to passage of the interface, as sensed by passage of the pig, the products passing through the pipeline may automatically be switched into the desired storage tanks (or from the desired storage tanks if the pig is being launched from mechanism 800).

If the mechanism 800 is to be used for launching, the switch 900 is moved to the "launch" position, which causes rotation of the basket 801 through an arc of 180°. The switches being preset, the sequence following the launching of the pig occurs automatically, as set forth hereinabove with respect to the receipt of a pig, and the warning signal will indicate that the change has taken place. At this point, the pig launch switch may be returned to the "off" position, at which time the control system at motor 802 will reset for another 180° rotation. The launch switch will then again be actuated in order to return the basket to its initial position, and upon the return of the launch switch to the "off" position for the second time, the pig launcher will then be ready for launching a second pig. The reset switch will then be actuated as set forth hereinabove, the valves which have been automatically closed being previously changed to the closed position by activation of the valves 828, 851 or 863, respectively, or being controlled to remain open by movement of the switches 828, 851, and 863 to the open position as desired.

Having disclosed in detail the substance of the present invention and the objects thereof, including the preferred embodiment, what is desired to be protected by Letters Patent should be determined not by the specific examples herein given, but only by the subject matter defined in the appended claims.

I claim:
1. A control system for selectively operating a plurality of valves, each having a valve actuator, which comprises
 a plurality of circuit means, each circuit means comprising
  first, second, and third electrically conductive means,
  first switch means for selectively connecting either of said second and said third electrically conductive means to said first electrically conductive means,
  fourth electrically conductive means for energizing a single valve actuator,
  second switch means for selectively connecting either of said second and third electrically conductive means to said fourth electrically conductive means,
  third switch means interposed in said fourth electrically conductive means for selectively interrupting the flow of electricity therethrough,
 and means for moving all of said first switch means in concert from a first position connecting said first and said second electrically conductive means to a second position connecting said first and said third electrically conductive means.

2. A control system in accordance with claim 1 further comprising, in each of said circuit means, short-circuiting means bypassing said first, second and third switch means for selectively connecting said first and said fourth electrically conductive means.

3. A system comprising a pipeline through which a pig may be passed and a plurality of pipes communicating with said pipeline, each of said pipes being controlled by a solenoid valve interposed therein,
 a plurality of circuit means, one for each solenoid valve, each circuit means comprising
  first, second and third electrically conductive means,
  first switch means for selectively connecting either of said second and said third electrically conductive means to said first electrically conductive means,
  fourth electrically conductive means for energizing a single solenoid valve,
  second switch means for selectively connecting either of said second and said third electrically conductive means to said fourth electrically conductive means,
  third switch means interposed in said fourth electrically conductive means for selectively interrupting the flow of electricity therethrough,
 sensing means for sensing the passage of a pig past a predetermined point in said pipeline,
 and means responsive to said sensing means for moving all of said first switch means in concert from a first position connecting said first and said second electrically conductive means to a second position connecting said first and said third electrically conductive means.

4. A control system in accordance with claim 3 further comprising, in each of said circuit means, short-circuiting means bypassing said first, second and third switch means for selectively connecting said first and said fourth electrically conductive means.

5. A system in accordance with claim 4 wherein there are at least three circuit means.

6. A control system in accordance with claim 5 further comprising alarm means actuated in response to said sensing means.

References Cited by the Examiner
UNITED STATES PATENTS

| | | | |
|---|---|---|---|
| 2,965,114 | 12/1960 | Harden | 137—268 |
| 2,965,125 | 12/1960 | Osborne et al. | 137—268 |
| 3,089,030 | 5/1963 | Scherbatskoy | 137—2 XR |

M. CARY NELSON, *Primary Examiner.*

MARTIN P. SCHWADRON, *Examiner.*